United States Patent Office 3,157,061
Patented Nov. 17, 1964

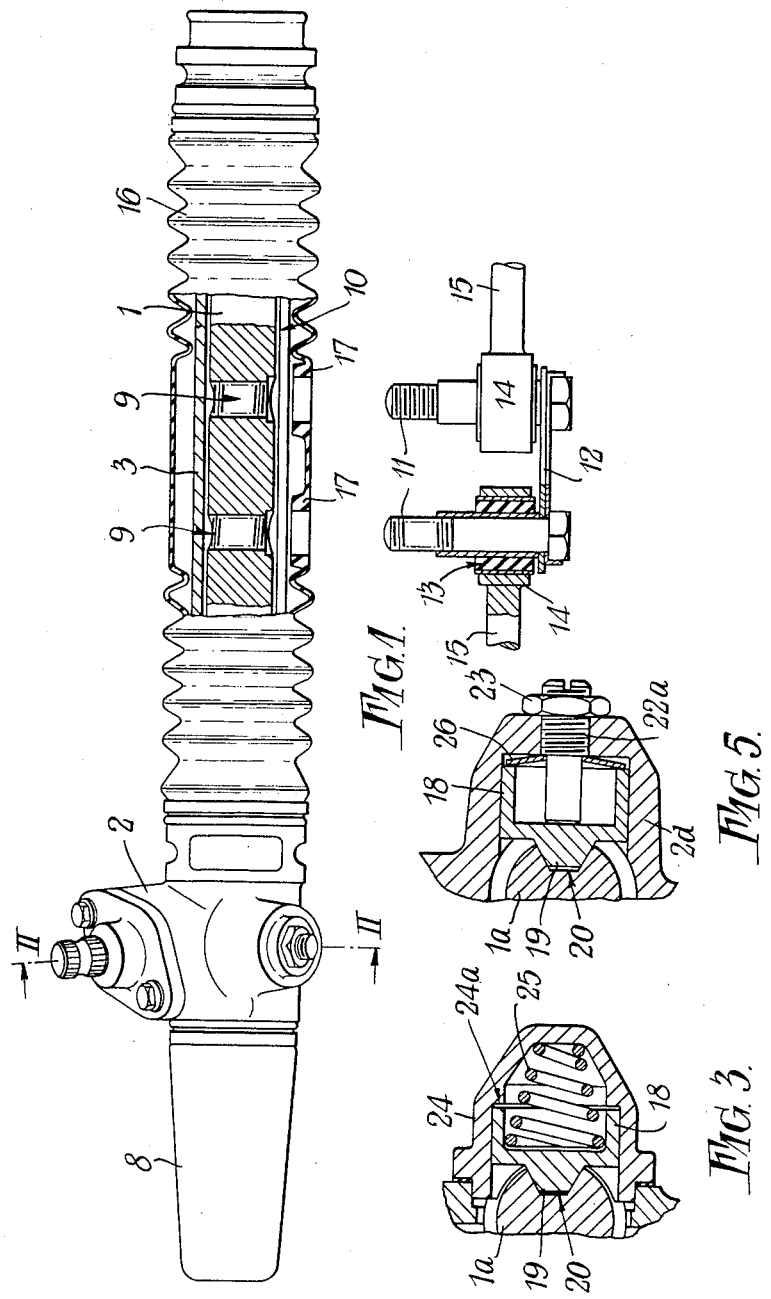

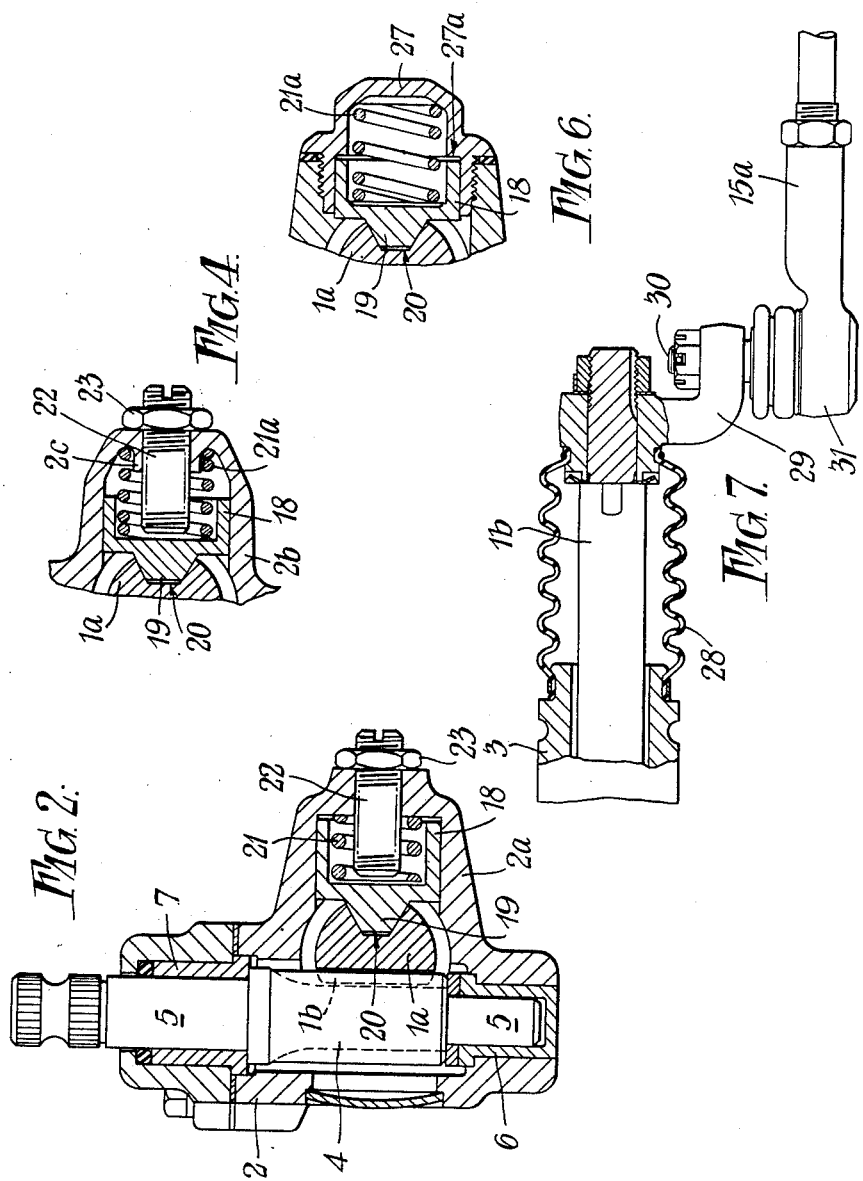

3,157,061
STEERING GEAR
Robert William Parker, Clevedon, Somerset, England, assignor to Engineering Productions (Clevedon) Limited, Clevedon, Somerset, England, a British company
Filed Mar. 22, 1962, Ser. No. 181,610
10 Claims. (Cl. 74—498)

This invention relates to rack and pinion steering gear for vehicles, the gear being of the type in which a pinion, rotatable by the steering wheel of the vehicle, is supported in a casing in mesh with a longitudinally slidable rack which extends laterally through the casing to form part of a steering linkage.

A main object of the invention is to improve the construction of such steering gear and accordingly, the invention provides a steering gear of the type specified wherein the rack is held against rotation in the pinion casing by co-action of the pinion and a bearing means located in a part of the casing structure and slidably keyed into a keyway formed along the back of the rack.

In order that the invention may be clearly understood and readily carried into effect, a number of embodiments thereof will now be described in detail with reference to the accompanying drawing, in which:

FIGURE 1 is a part-sectional exploded plan view showing a rack and pinion steering gear, with one end cap omitted, constructed in accordance with the invention, and also showing end parts of steering rods arranged for overhung connection with the rack, FIGURE 2 is a section on the line II—II of FIGURE 1 drawn to a larger scale, FIGURES 3 to 6 are sectional detail views showing various modifications of FIGURE 2, and FIGURE 7 is a detailed part-sectional plan view to the same scale as FIGURE 1 and shows an alternative form of overhung connection between a steering rod end and the rack of a steering gear to which the invention is applicable.

Referring now more particularly to FIGURES 1 and 2 of the drawing, the rack and pinion steering gear shown therein is intended for a motor vehicle and has a rack 1 in the form of an elongated circular-section member having one end portion 1a formed with transverse rack teeth 1b in known manner. This rack 1 is arranged to extend laterally through side openings in a pinion casing 2, the casing opening through which the non-toothed end of the rack projects, being extended by an outer sleeve 3 which loosely surrounds the projecting part of the rack. At or near the outer end of this sleeve, the rack is slidably supported in the sleeve by a bearing bushing (not shown).

A pinion 4 formed or provided on a short shaft 5 is rotatably housed in a bore in the casing, extending transversely to the toothed end of the rack, so that the pinion meshes with the rack teeth 1b. The pinion shaft 5 is supported in the bore of the casing by flanged bushings 6 and 7 which surround the shaft at opposite ends of the pinion 4 between the shaft and casing bore surface. Alternatively, ball bearings can be used to support the pinion.

The casing opening through which the toothed end of the rack projects is sealed by a relatively deep end cap 8 into which the rack can project on axial movement, as a result of rotation of the pinion. The sleeve extension on the opposite casing opening is normally also similarly capped but is not so shown in FIGURE 1 of the drawings.

Formed diametrically through the rack 1 at locations intermediate the ends thereof, and near the center of the plain part of the rack, are two tapped axially spaced holes 9. An elongated axial slot 10 is provided through the outer sleeve extension wall in register with these holes, the length of the slot 10 being sufficient to permit full range of movement of the rack as will later become clear. Arranged to screw into the rack holes 9 through the slot 10 are headed pins 11 which are of such length that the head ends thereof then overhang from the rack and from the sleeve extension 3. The two pins 11 are rigidly linked together at their head ends externally of the casing by means of a plate 12 and may be fitted at the head ends with non-metallic bushings 13. These bushings 13 are in turn fitted into bossed ends 14 of steering rods or links 15, which then extend from the pins respectively in opposite directions lengthwise of the rack for connection with other parts of the steering linkage.

Alternatively, the connection between the rod or link ends and the threaded holes in the rack could be effected through ball joints overhanging from ball pins threaded into the rack holes.

The outer sleeve extension 3 of the casing 2 is enclosed by an outer flexible sleeve 16 which serves to prevent dust and dirt entering through the axial slot 10 in the sleeve extension. This flexible sleeve 16 is sealed at each end to the sleeve extension and may have corrugated portions at the outer ends, to increase flexibility, and a center plain cylindrical portion in the region of the rack holes. This plain portion of the flexible sleeve has bossed openings 17 therein through which the ends of the pins project for connection with the steering rods or links 15.

Behind the toothed end 1a of the rack and substantially opposite the pinion 4, the casing 2 is provided with an extension housing 2a which, in the embodiment shown in FIGURE 2, is internally cylindrical and contains bearing means in the form of a skirted plunger 18 which may be metallic or non-metallic or may have a metallic core with a non-metallic covering. The head of this plunger 18 is provided with a projection 19, which may have converging side walls as shown, to constitute a key engageable in a complementary keyway 20 which extends lengthwise along the back of the rack. The plunger 18 is urged into slidable keyed engagement with the rack keyway so as to exert a loading pressure on the rack, in opposition to the pinion, by means of a coil spring 21 which is trapped between the back of the plunger head and the outer end of the extension housing 2a in which the plunger is housed. This outer extension end may also have a tapped aperture therethrough to receive an adjusting screw 22, the inner end of which then lies close to the back of the plunger head and which can be screwed in more or less to adjust the permitted movement of the plunger. The screw 22 has an associated lock nut 23 thereon. Between the spring and the back of the plunger head, a bearing plate (not shown) may be inserted.

In the modified embodiment shown in FIGURE 3, an extension housing 24 for the plunger 18 is provided by a hollow flanged cap which is arranged to screw into a tapped opening in the casing 2. Alternatively, of course, the hollow flanged cap could be secured to the casing 2 by bolting or in any other convenient manner. Within the extension housing 24 there is provided a coil spring 25 which, in this example, has turns of reducing diameter and bears at the larger end on the back of the plunger head with or without the intermediary of a bearing plate. The closed end of extension housing 24 is then correspondingly reduced to provide a locating seating for the outer spring end. A spring having turns of reducing diameter could, of course, also equally well be used with an integral extension housing on the casing 2 which may again have a reduced internal diameter at the closed outer end. Within the extension housing 24, an internal annular shoulder 24a may be provided as shown to abut the rear plunger rim and thereby limit permitted outward axial movement of the plunger.

The modification shown in FIGURE 4, has an extension housing 2b which is integral with the main pinion casing but which could equally be in the form of a detachable cap. In the housing 2b there is again provided a plunger 18 which keys into the rack and which is influenced by a coil spring 21a. This coil spring 21a is somewhat longer than the spring 21 shown in FIGURE 2 and is provided with additional location at the outer end by an inwardly projecting lip 2c which extends around the tapped aperture in the outer housing end for the screw 22. Again, of course, a bearing plate could be provided between the inner end of screw 22 and the back of the head of plunger 18.

The embodiment of plunger and extension housing shown in FIGURE 5 is somewhat similar to the embodiment of FIGURE 2 except that the coil spring 21 is replaced by a flat annular type of spring 26 through the central opening of which a plain shank end of a slightly modified adjusting screw 22a is passed. A shoulder on screw 22a then bears on the rim of the spring opening to permit adjustment of spring loading, while the outer margin of the spring bears on the rim of the skirt of plunger 18.

In FIGURE 6 the modification is somewhat similar to FIGURE 3 and employs an internally shouldered plunger extension housing 27 in the form of a screw-in cap. The internal shoulder 27a in this housing again provides an internal abutment for the rim on the skirted plunger 18 and the spring 21a may be similar to the spring of FIGURE 4.

Although various possible forms of the plunger and extension housing have been illustrated by way of example, it will be appreciated that both the extension housing and the plunger could take various other forms to suit individual requirements and available space and parts in the various figures may be interchanged. Equally the plunger key and complementary keyway in the rack may have any appropriate shaping providing the plunger is capable of maintaining the rack firmly in mesh with the pinion and, at the same time, of resisting the twisting moment which the steering rods or links will tend to exert on the rack due to movements of the vehicle suspension and/or steering. For example, the plunger key or projection may be radiused, relieved or curved to minimize resistance to sliding in the rack keyway.

The various forms of bearing means which have been described for maintaining the rack and pinion in mesh and for co-acting with the pinion to prevent rack rotation in the steering gear of FIGURE 1, are equally applicable to a rack and pinion steering gear in which overhung connections with steering rods or links are provided at the rack ends. One example of such an overhung connection is shown in FIGURE 7, in which the rack end 1b is extended beyond the end of the outer sleeve extension 3 of the pinion casing and encased in a flexible outer sleeve 28. The overhung connection with steering rods 15a is then provided by an elbowed arm 29 which is secured, by screwing or otherwise, to the rack end and, at the outer end, engages the ball pin 30 of a ball joint 31 housed in the outer end of the steering rod 15a. As will be appreciated, a similar overhung connection will be provided also at the opposite end of the rack with such an arrangement. The invention is, of course, also applicable to a rack and pinion steering gear having the overhung connections at the same end of the rack. In this case, two ball joints may be provided at a rack end such as is shown in FIGURE 7 to connect two steering rods.

I claim:
1. In a rack and pinion steering gear for a vehicle, the combination of a pinion casing having side openings therein, an extension sleeve projecting from one side of said casing in register with said openings, a steering pinion rotatably mounted in said casing, a toothed rack slidably supported in said sleeve and extending laterally through said casing side openings to mesh with said pinion, an extension housing opening from said casing behind said rack and substantially opposite said pinion, a spring-influenced plunger supported for axial movement in said extension housing, a projecting key on the inner head end of said plunger having side walls which converge towards the key extremity and a complementary keyway along the back of said rack in which said key slidably engages under said plunger spring-influence to prevent rotation of said rack in the pinion casing and also to maintain said rack firmly in mesh with said pinion, said key being shaped to permit lubrication of the rack keyway and to minimize resistance to sliding movement of the keyway.

2. A combination as claimed in claim 1 in which retraction of said plunger in its housing is limited by an integral shoulder within the said housing.

3. A combination as claimed in claim 1 in which retraction of said plunger in its housing is limited by an adjustable screw which is engaged through a tapped aperture in the housing end to approach the back of said plunger.

4. A combination as claimed in claim 1 in which the plunger extension housing is in the form of a cap detachably secured over an opening in said casing.

5. A combination as claimed in claim 1 in which the plunger extension housing is formed integrally with the pinion casing.

6. A combination as claimed in claim 1 in which the plunger is influenced by a coil spring which has reducing turns towards the end remote from the plunger.

7. A combination as claimed in claim 1 in which said plunger has a skirt and is influenced by an annular flat spring which bears around the rim of said skirt, an adjusting screw being passed through a tapped aperture in the housing end and through the center of said spring and being shouldered to apply adjustable pressure to the rim of the spring center opening thereby to vary the spring compression.

8. A combination as claimed in claim 1 in which said rack is adapted for attachment to steering rods or links by means of overhung steering connectors applied near the outer ends of the rack.

9. A combination as claimed in claim 1 in which said rack is adapted for attachment to steering rods or links by means of overhanging steering connectors.

10. A combination as claimed in claim 9 in which said steering connectors are in the form of screwed pins which engage tapped apertures formed diametrically through the rack, the said pins being arranged to project from the rack to engage the steering rods or links extending lengthwise of the rack.

References Cited by the Examiner
UNITED STATES PATENTS
2,954,703  10/60  Morrell _____ 74—422
FOREIGN PATENTS
892,101  10/53  Germany.
1,075,959  2/60  Germany.
776,052  6/57  Great Britain.

BROUGHTON G. DURHAM, *Primary Examiner.*